United States Patent [19]
Cassels

[11] 3,775,699
[45] Nov. 27, 1973

[54] LASER HAVING A GAS-FILLED FABRY-PEROT ETALON MODE SELECTOR

[75] Inventor: Ian Gardner Cassels, Loughborough, England

[73] Assignee: Ferranti Limited, England

[22] Filed: Feb. 3, 1971

[21] Appl. No.: 112,214

[52] U.S. Cl. ............................... 331/94.5, 356/112
[51] Int. Cl. ............................................. H01s 3/08
[58] Field of Search.................... 331/94.5; 350/160; 356/106, 112

[56] References Cited
UNITED STATES PATENTS

| | | | |
|---|---|---|---|
| 3,582,815 | 6/1971 | Siebert | 331/94.5 |
| 3,466,565 | 9/1969 | Rigrod | 331/94.5 |
| 3,546,620 | 12/1970 | Erickson et al. | 331/94.5 |
| 3,611,436 | 10/1971 | Rigrod | 331/94.5 |

*Primary Examiner*—William L. Sikes
*Attorney*—Cameron, Kerkam & Sutton

[57] ABSTRACT

A laser contains within its optical cavity a mode selector comprising a prism and a Fabry-Perot etalon. The etalon has two spaced parallel surfaces slightly inclined to a normal to the optical axis, one of the surfaces being formed by a face of the prism. The surfaces may be plane or spherical, and the mode selector may be used with gas or solid crystal lasers. The spacing of the etalon surfaces may be varied for tuning purposes.

12 Claims, 5 Drawing Figures

LASER HAVING A GAS-FILLED FABRY-PEROT ETALON MODE SELECTOR

This invention relates to lasers, and in particular to mode selectors for lasers.

It is a property of many lasers that they are capable of producing radiation at a number of different wavelengths, and it is usual to provide some means either for selecting the desired wavelength or for suppressing any unwanted wavelength. If the wavelengths are fairly widely separated, as is usually the case, then wavelength selection is fairly simple, and frequently makes use of the dispersive effect of a prism located within the optical cavity of the laser. However, it has been found that frequently the radiation selected by this means from a number of widely separated wavelengths itself consists of a number of discrete and closely spaced wavelengths, and operation at one only of these wavelengths is to be perferred. The use of a dispersing prism is insufficient, since the angular separation between the radiations emerging from the dispersing prism is very small. It is also very useful to be able to "tune" the laser, that is to vary the wavelength of the output radiation over the ranges normally covered by the closely spaced wavelengths. It is known to use an optical element known as a Fabry-Perot etalon to achieve mode selection in a laser. The etalon has been used for other purposes in conventional optical arrangements for a considerable time, and generally comprises a block of glass or other similar solid material having opposite faces accurately parallel to one another. The disadvantage of utilizing solid etalons for laser mode selection is that its refractive index is sensitive to changes in temperature, and this affects the mode selection function.

It is an object of the invention to provide a laser having means for selecting the wavelength of the output radiation from a number of closely spaced discrete wavelengths. Another object of the invention is to provide a laser having within its optical cavity a gas filled Fabry-Perot etalon for selecting the wave length of the output radiation from a number of closely spaced discrete wave lengths.

According to one embodiment of the present invention, there is provided a laser having a gas filled Fabry-Perot etalon within the optical cavity of the laser for selecting the wave length of the output radiation from a number of closely spaced discrete wavelengths.

According to another form of the present invention there is provided a laser which includes within its optical cavity a prism and a Fabry-Perot etalon comprising two spaced parallel surfaces each slightly inclined to a normal to the optical axis of the laser, one of said parallel surfaces of the etalon being formed by a face of the prism.

Also according to the invention there is provided a laser as set out in the preceding paragraph in which the other surface of the etalon is formed by a face of a second prism.

In this specification and claims the expression "two spaced parallel surfaces" is used to cover not only the case where the two surfaces are plane surfaces, but also any case where the surfaces are part-spherical surfaces having the same centre of curvature.

The invention will now be described with reference to the accompanying drawings, in which.

Figure 1:
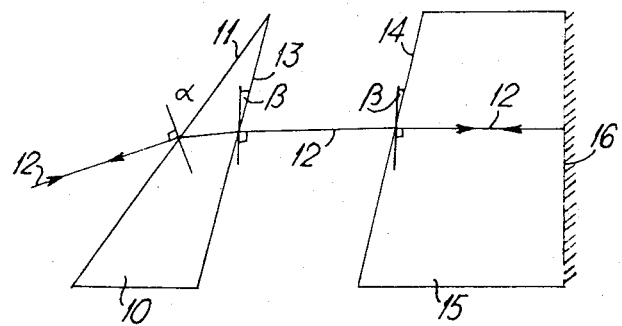
FIG. 1 is a schematic diagram of part of a gas laser optical system according to a first embodiment of the invention.
Figure 2:
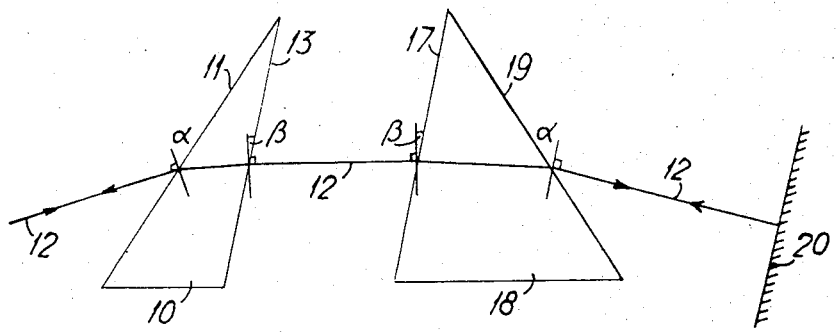
FIG. 2 is a similar diagram of a second embodiment.
Figure 4:
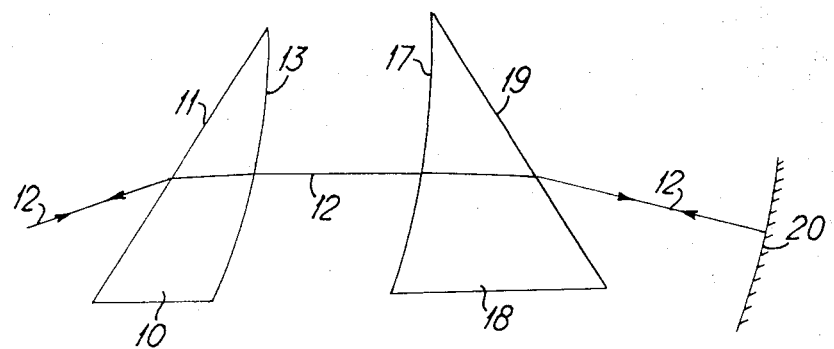
FIG. 4 shows a modified form of the embodiment of FIG. 2.

In FIGS. 1, 2 and 4 one end resonator mirror and the laser active region have been omitted for convenience.

Referring now to FIG. 1, the optical cavity of a gas laser has located within it a prism 10. One face 11 of the prism is arranged at an angle $\alpha$ relative to a normal to the optical axis 12, the angle being approximately equal to the Brewster's angle for the selected wavelength, or for the centre of the band over which the laser is to be tunable. The other face 13 of the prism 10 is inclined at a small angle $\beta$ to a normal to the optical axis. The angle $\beta$ is shown much exaggerated in the drawings. This face 13 forms one surface of a Fabry-Perot etalon, the other parallel surface 14 being part of a block 15 of optically transparent material. The rear surface 16 of the block 15 carries a high-reflectivity coating and forms one resonator mirror of the laser. The prism-etalon combination is located within the laser optical cavity, and the space between the surfaces may be filled with the laser gas mixture.

The prism 10 causes dispersion of the radiation incident upon it, and the desired band of wavelengths is reflected back along the cavity by the mirror surface 16. The Fabry-Perot etalon effects the selection of the desired radiation from the desired band of wavelengths. The spacing between the two parallel faces 13 and 14 of the etalon determines which wavelength passes along the optical axis to the mirror surface 16 without loss, the other wavelengths being partially reflected away from the optical axis and hence suppressed. Slight adjustment of the angle $\alpha$ of the combined prism 10 and block 15 to the optical axis allows the selected band of wavelengths to be changed, but it is necessary to ensure that the angle $\alpha$ of face 11 of prism 10 is still effectively the Brewster's angle, to avoid excessive reflection losses from that face.

One problem occurring with the arrangement described above is that the dispersion introduced by the prism may not be sufficient to give adequate angular separation between adjacent bands of wavelengths at which the laser may radiate. FIG. 2 illustrates an alternative embodiment which increases the dispersion angle. In FIG. 2 the prism 10 has, as before, a face 11 arranged at an angle $\alpha$ to a normal to the optical axis 12, the angle being approximately equal to Brewster's angle as before, and a face 13 slightly inclined to a normal to the optical axis. The other, parallel, surface of the etalon is now formed by one face 17 of a second prism 18. The other face 19 of the prism 18 is also arranged at approximately the Brewster's angle to a normal to the optical axis 12 of the laser. The laser resonator mirror 20 is now external to the prism-etalon combination. This arrangement increases the total dispersion and hence increases the separation between radiations of different frequency. The use of a separate mirror 20 enables the selection of the desired band of frequencies to be accomplished by small angular adjustments of either the double prism and mirror combination as a whole, or of the mirror alone.

The combination of the etalon and the dispersing prism may reduce the number of surfaces in the optical cavity of the laser, and the path length in the prism material, and hence reduces the losses.

FIG. 1 and 2 show laser mode selection suitable for use with gas lasers. Although the same problems of multiple-wavelength emission do not arise with lasers using a solid active medium, such as a ruby crystal, the invention may still be applied to such lasers with useful effect. In a ruby laser, although only a single wavelength is emitted, the spectrum line tends to become broadened due to Doppler effects, and the invention may be used to overcome the disadvantages resulting from this.

Figure 3:
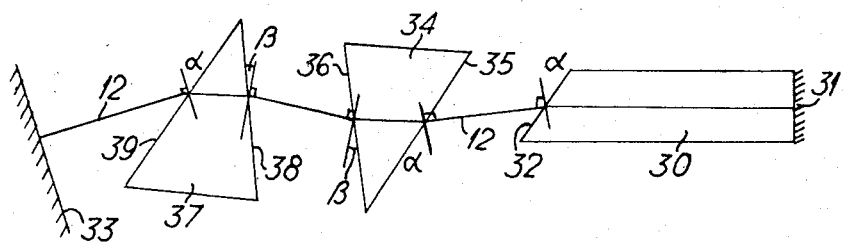
FIG. 3 shows the arrangement of FIG. 2 modified for use with a ruby laser.

FIG. 3 shows the application of the invention to a ruby laser. The ruby crystal 30 has one end 31 ground to form one resonator mirror of the laser, and has the other end 32 ground at the Brewster angle α. The prism arrangement of FIG. 2 is placed in the optical cavity between the crystal 30 and a second resonator mirror 33. The prism arrangement of FIG. 2 is slightly modified in that one of the prisms is inverted. Prism 34 has one face 35 inclined to a normal to the optical axis at the Brewster angle α and has the other face 36 slightly inclined by the angle β to a normal to the axis. Similarly, the other prism 37 has one face 38 arranged parallel to face 36 of prism 34, and the other face 39 inclined at the Brewster angle α to a normal to the optical axis.

The two prisms are arranged in this manner because the dispersive effect is not required due to the single-wavelength emission from the crystal. The Fabry-Perot etalon operates in the manner already described.

The arrangement of FIG. 1 may similarly be used with a ruby laser. The excitation means have not been shown in FIG. 3.

FIGS. 1 to 3 show laser mode selectors which are suitable for use with the lasers having plane resonator mirrors. The wavefront in the optical cavity of such lasers is itself plane, and hence the surfaces of the Fabry-Perot etalon should themselves be plane. Frequently, however, resonator mirrors are spherical, and hence the wavefront will itself be spherical, at least adjacent to the mirrors. Hence a Fabry-Perot etalon with spherical surfaces should be used if the etalon is located adjacent to one of the mirrors. FIG. 4 shows a modified form of FIG. 2 having curved surfaces for the etalon. The two curved surfaces 13 and 17 should be concentric so that in a radial direction from the centre of curvature they are always the same distance apart, corresponding to the parallel plane surfaces of FIG. 2. The effect of inclining the surfaces of the etalon of FIG. 2 by the angle α to a normal to the optical axis is produced in this embodiment from the optical axis centre of curvature of the surfaces from the optical axis of the laser to a small extent.

The curvature of the surfaces is dependent upon the position of the etalon within the optical cavity, and is shown greatly exaggerated in FIG. 4.

Alignment of the parallel surfaces of the etalon to the optical axis of the laser is not critical, a usual value of the angle β being a few milliradians. However, as is usual, the two surfaces of the etalon must be accurately parallel.

The surfaces of the etalon may be coated or uncoated as desired.

Figure 5:
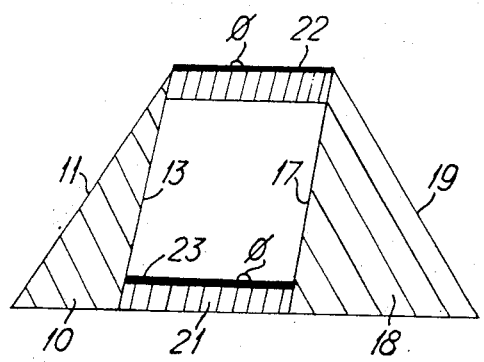
FIG. 5 illustrates a method of tuning the laser of FIG. 2.

One of the advantages of the gas-spaced etalon is the ease with which it may be "tuned" to select the desired radiation frequency. As already stated, it is the spacing of the parallel surfaces of the etalon which determines the wavelength which is reflected by the resonator mirror back along the optical axis of the laser. However, tuning may be effected by varying any one of three characteristics of the etalon. One characteristic is the spacing itself, a second is the angle β between the surfaces and a normal to the optical axis of the laser, and the third is the refractive index of the material between the surfaces of the etalon. Hence the laser may be accurately tuned by varying one of these. The most desirable to control is the spacing between the etalon surfaces, and FIG. 5 illustrates such an arrangement using the embodiment of FIG. 2.

In all embodiments it is necessary to support the two bodies forming the surfaces of the etalon so that only the desired relative movement between these surfaces is allowed. In FIG. 5 the two prisms 10 and 18 are secured together by a "cylinder" 21 of a piezo-electric material arranged substantially coaxial with the optical axis between the two prisms. The cylinder has a cross-section similar in shape to that of the two faces 13 and 17. Conductive surfaces 22 and 23 are formed on the inner and outer surfaces of the cylinder and wires are attached to these. If the space within the etalon is to be filled with the gas mixture contained in the laser tube, then apertures are formed around the edge of the cylinder. Alternatively the space may be filled with any required gas or gas mixture and may be sealed.

The application of a potential difference across the thickness of the material forming the cylinder will cause an increase or decrease in the length of the cylinder, dependent upon the polarity of the applied potential difference. The magnitude of the length change is dependent upon the magnitude of the potential difference, and thus the spacing of the two faces of the etalon may be closely controlled and readily varied.

It is possible, though not so desirable, to control the angle of the surfaces of the etalon to the optical axis of the laser. Similarly the refractive index of the gas within the etalon may be varied, through changes in the gas pressure, the etalon being sealed for this purpose.

Of the three techniques, that of varying the spacing of the two surfaces of the etalon is the simplest to control and is to be preferred. The techniques may equally be applied to the other embodiments described.

What I claim is:

1. A laser including within its optical cavity a prism and a Fabry-Perot etalon, saie etalon comprising two spaced parallel surfaces each slightly inclined to a normal to that part of the laser optical axis lying between the two surfaces, one of the parallel surfaces of the etalon being formed by a face of the prism and the space between the parallel surfaces being filled by a gaseous medium.

2. A laser as claimed in Claim 1 further including a block of optically transparent material, the other of the parallel surfaces of the etalon being formed by an adjacent surface of the block of optically transparent material, the remote surface of the block forming a resonator mirror of the laser.

3. A laser as claimed in claim 1 further including a second prism, the other of the parallel surfaces of the etalon being formed by a face of the second prism.

4. A laser as claimed in claim 1 including means between the parallel surfaces of the etalon for adjusting the spacing therebetween.

5. A laser as claimed in claim 4 in which the means between the two parallel surfaces of the etalon includes a common member of piezo-electric material separating said parallel surfaces, said member including conductive means for applying to the material a direct current potential difference of adjustable value thereby varying the extent of the separation between the said surfaces.

6. A laser as claimed in claim 5 wherein said means forms a seal for sealing the space between the parallel surfaces of the etalon.

7. A laser as claimed in claim 1 including a gaseous active medium, the space between the parallel surfaces of the etalon containing the same gaseous medium.

8. A laser as claimed in claim 1 in which the two spaced surfaces of the Fabry-Perot etalon are concentric spherical surfaces, and means for supporting the surfaces such that the tengent to each surface at the point of intersection of the surface and that part of the optical axis lying between the two surfaces being slightly inclined to a normal to the said part of the optical axis.

9. A laser as claimed in claim 1 including means for supporting the spaced surfaces such that the inclination of each spaced surface of the etalon to a normal to that part of the optical axis lying between the spaced surfaces is of the order of a few milliradians.

10. A laser as claimed in claim 8 in which the spaced surfaces are supported such that the inclination of each said tangent to the said normal is of the order of a few milliradians.

11. A laser including within its optical cavity thermally stable mode selector means for selecting the wavelength of the output radiation from a number of closely spaced discrete wave lengths, said mode selector means comprising a first prism and a second prism spaced from each other, each prism having a first face inclined at an angle in the order of a few milliradians to a normal to that part of the laser optical axis lying between the two first faces of the prisms, said first faces being parallel to each other thereby forming a prism-Fabry/Perot etalon combination, each said prism having a second face inclined at an angle relative to a normal to the optical axis of the laser at said second face, said angle being approximately equal to the Brewster's angle for the selected wavelength, said laser having a resonator mirror surface along its optical axis, means for adjusting the spacing between the parallel faces, said means including a common member of piezo-electric material extending between said parallel faces and supporting said faces such that only a desired relative movement between said faces is allowed, said member having spaced conductive surfaces thereon for applying across the thickness of said member a potential difference for causing a change in the length of said member.

12. A laser as set forth in claim 11 wherein said mirror surface is external to the prism etalon combination and said first faces are concentric spherical surface.

* * * * *